(No Model.) 9 Sheets—Sheet 1.

H. PEARSON.
RAILWAY SLEEPING CAR.

No. 549,391. Patented Nov. 5, 1895.

Fig. 1.

Witnesses:
J. W. Fayfield
K. J. Clemons

Inventor
Henry Pearson
by Chapin & Co.
Attorneys (No Model.) 9 Sheets—Sheet 4.
H. PEARSON.
RAILWAY SLEEPING CAR.

No. 549,391. Patented Nov. 5, 1895.

(No Model.) 9 Sheets—Sheet 6.

H. PEARSON.
RAILWAY SLEEPING CAR.

No. 549,391. Patented Nov. 5, 1895.

Witnesses:
J. W. Gayfield
K. S. Clemons

Inventor,
Henry Pearson
by Chapin & Co.
Attorneys.

(No Model.) 9 Sheets—Sheet 7.

H. PEARSON.
RAILWAY SLEEPING CAR.

No. 549,391. Patented Nov. 5, 1895.

Witnesses:
J. W. Garfield.
H. A. Clemons

Inventor,
Henry Pearson,
by Chapin & Co.
Attorneys (No Model.) H. PEARSON. 9 Sheets—Sheet 8.
RAILWAY SLEEPING CAR.

No. 549,391. Patented Nov. 5, 1895.

Witnesses:
J. W. Garfield
K. I. Clemons

Inventor,
Henry Pearson
by Chapin &co.
Attorneys.

(No Model.) 9 Sheets—Sheet 9.

H. PEARSON.
RAILWAY SLEEPING CAR.

No. 549,391. Patented Nov. 5, 1895.

Witnesses:

Inventor:
Henry Pearson,
by ______
Attorneys.

UNITED STATES PATENT OFFICE.

HENRY PEARSON, OF SPRINGFIELD, MASSACHUSETTS.

RAILWAY SLEEPING-CAR.

SPECIFICATION forming part of Letters Patent No. 549,391, dated November 5, 1895.

Application filed December 31, 1894. Serial No. 533,434. (No model.)

*To all whom it may concern:*

Be it known that I, HENRY PEARSON, a citizen of the United States of America, residing at Springfield, in the county of Hampden and State of Massachusetts, have invented new and useful Improvements in Railway Sleeping-Cars, of which the following is a specification.

This invention relates to improvements in that class of sleeping-cars in which the car-body is provided with a pit or "berth-pocket," as termed, sunk below the ordinary floor of the car, within which the berths, their supports, and most of the berth-elevating devices are disposed during the day when the car is to be transformed from a sleeping-car to a drawing-room car.

A principal object of the invention is to arrange and combine, in a car having the berth-pocket and the covers or trap-doors therefor, the parts necessarily pertaining to a convertible car of the above description, (notably the trap-doors, berths, and the berth elevating and lowering devices,) so that the said trap-doors, which close and cover the berth-pockets and which are adapted to be swung up into upright positions, will support and carry the sheaves over which intermediate parts of the berth-elevating cables have guiding supports, a part of each cable, under this invention, being attached to the berth, while another part of the cable is attached to the winding-drum, which is located at a place suitably removed from and independent of the berth.

The object of the invention, furthermore, is to provide means whereby the berth supporting and operating devices embodying substantially the arrangement and manner of operation above set forth shall be always entirely certain, reliable, efficient, and satisfactory.

The invention consists in the combination, with the car-body, the berth, and a cable or like flexible connection having a supporting attachment to the berth, of a winding-drum mounted independently of and removed from the berth, to which said cable is also connected, and a guiding support for the cable intermediate between the berth and the winding-drum and means for operating the drum.

The invention also consists in the combination, with the car provided with a berth-pocket and trap-doors to serve as uprights, which are provided with sheaves, of the berth, winding-drums mounted independently of the berth, and cables connected to the berths, having running and supporting engagements over the sheaves and having winding connections with the drums, substantially as described; and the invention consists in various other constructions and arrangements of parts and appliances, all substantially as will hereinafter fully appear, and be set forth in the claims.

Reference is to be had to the accompanying drawings, in which.

Similar characters of reference indicate corresponding parts in all of the views.

The railway sleeping-car A has along its side a succession of pits or berth-pockets B, partitioned one from another, each of a width and length suitable to accommodate a berth and of a depth more than sufficient to receive therein two berths, one closely above the other. Each berth-pocket, as shown, is provided with a main bottom $a$ and a false bottom $a^2$ at some little distance thereabove.

Figure 1:
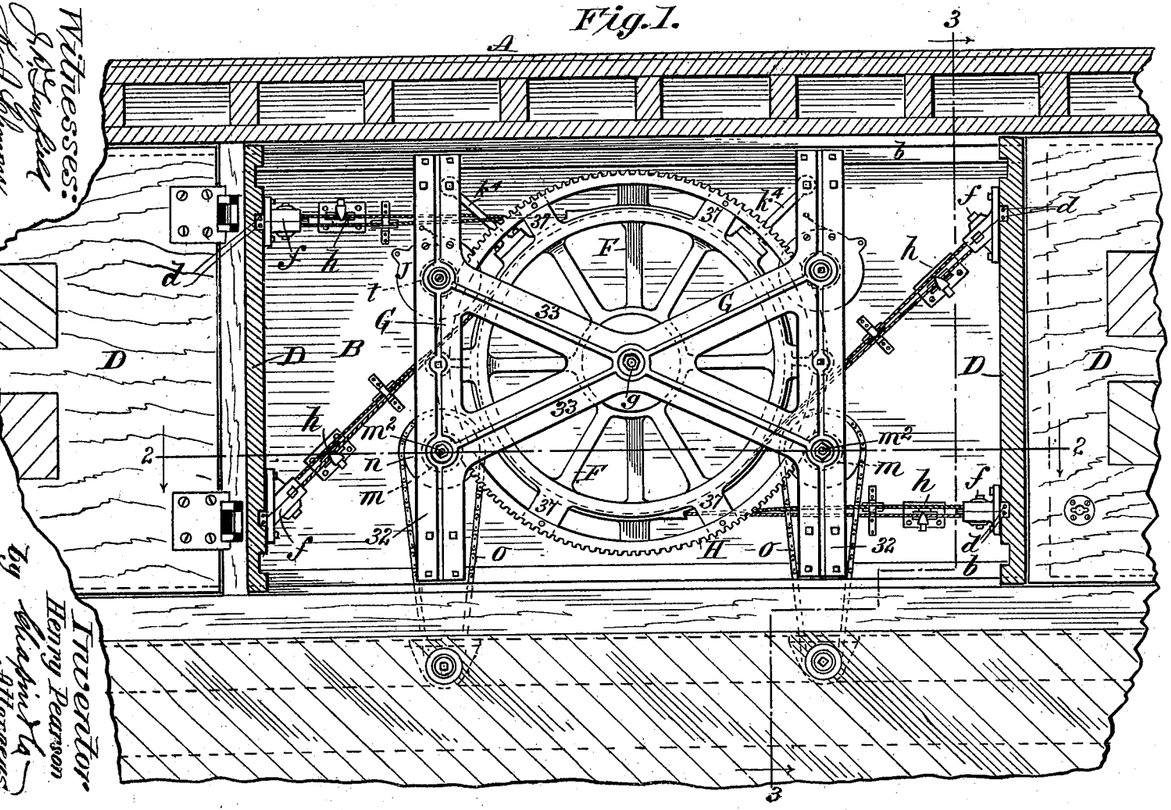
Figure 1 is a plan view of a side portion of the car comprising the berth-pockets, (up and out from which the trap-doors are understood as swung to their vertical positions, such doors being shown in horizontal cross-section,) the portions of the berth-elevating devices, which are located in the berth-pocket, being here exposed to view.
Figure 2:
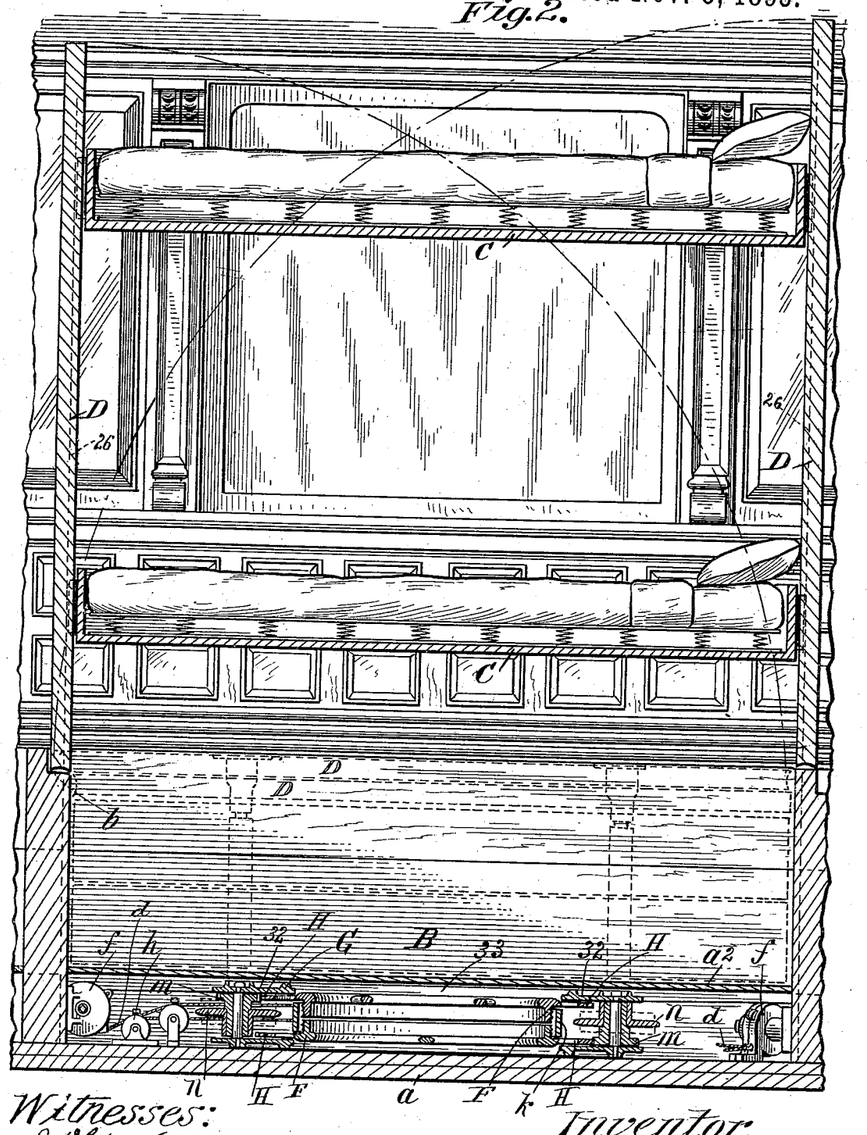
Fig. 2 is a sectional elevation longitudinally of a side portion of the car as taken on the line 2 2, Fig. 1, as viewed in the direction of the arrows.
Figure 3:
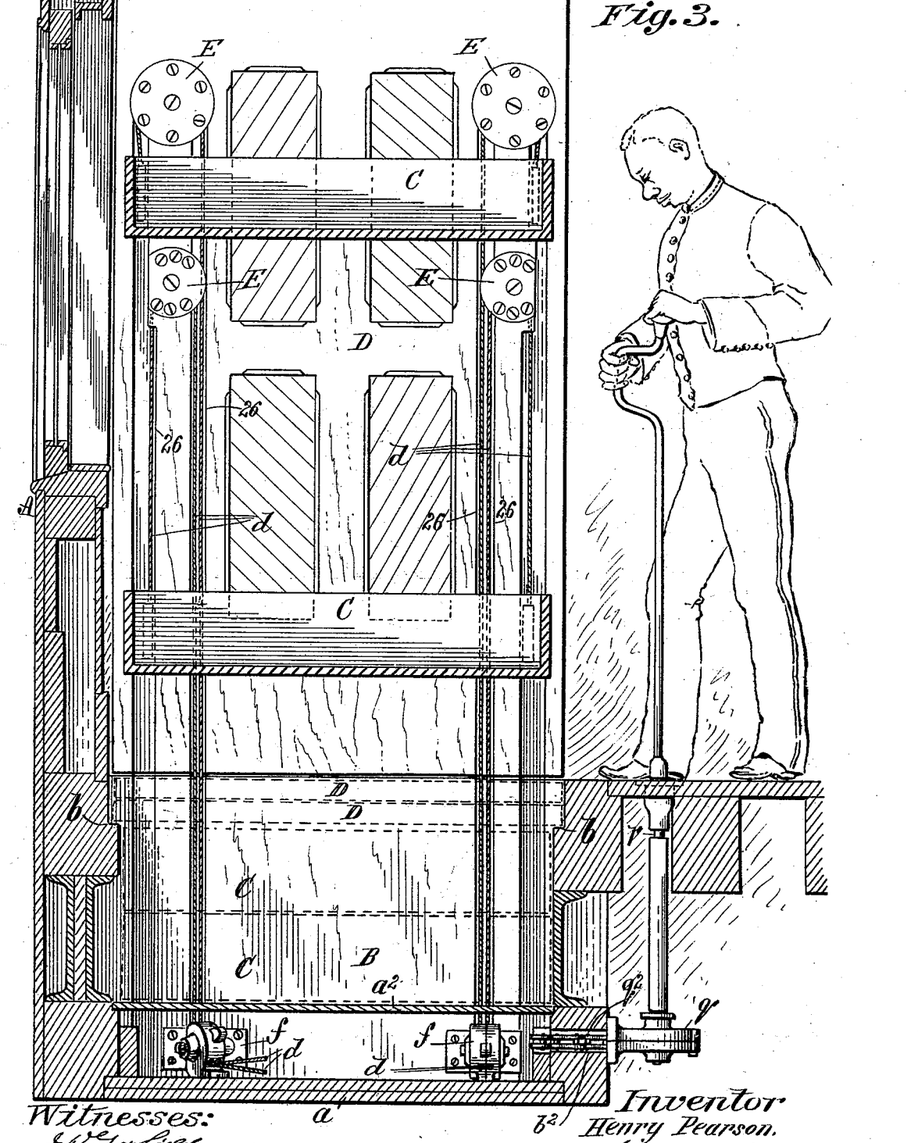
Fig. 3 is a vertical cross-section at one side portion of the car, one of the trap-doors in its upright position in elevation beyond the plane of section, and the berths in their raised positions. This section is taken substantially on the line 3 3, Fig. 1, as viewed in the direction of the arrow.
Figure 4:
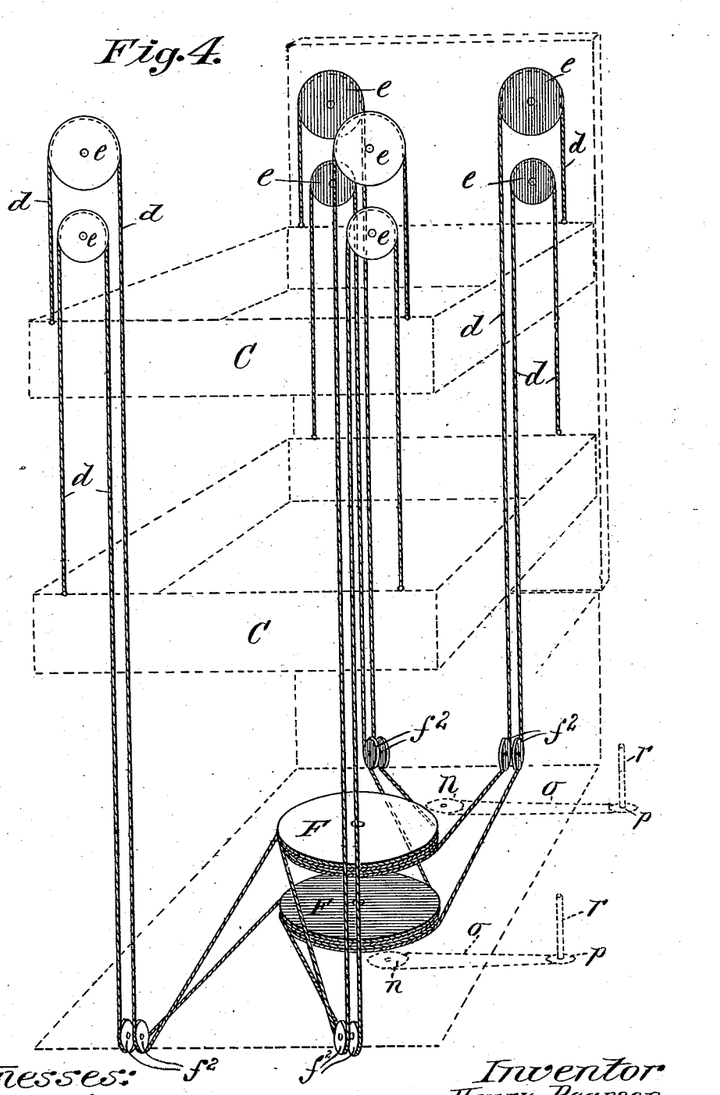
Fig. 4 is a view skeletonized and in the nature of a diagram, which is deemed advantageous in exhibiting in a very simple manner important characteristics of the present invention.

C C represent the berths, and D D represent the hinged or trap doors, which may be swung or folded down, as indicated by the dotted lines in Figs. 2 and 3, to lie closely and horizontally together on the supporting-ledges $b$, so as to be flush with the flooring of the car during the day, at which time the berths C C are in their out-of-the-way dispositions in the berth-pocket. Each of the trap-doors D has set within its inner face bushings or sheave-casings E, with the sheaves $e$ journaled therein. (See Figs. 3 and 20 to 23.)

In the bottom of each pit or berth-pocket is a winding-drum F, of comparatively-large diameter, for each of the berths. The two winding-drums, which are of slight thickness axially, are arranged the one on top of the other, both being journal-supported in a cage or framing therefor.

Figure 20:
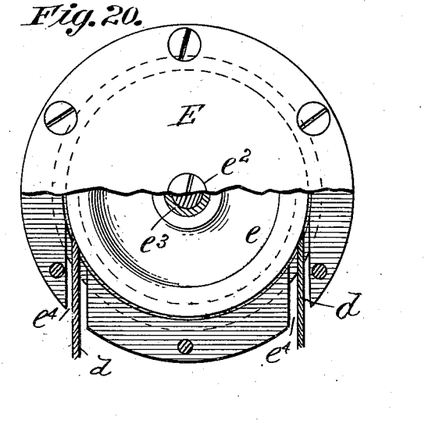
Figs. 20 and 22 are front views of the casings which are set within the trap-doors and which contain the cable supporting and guiding sheaves heretofore spoken of as supported by said trap-doors, portions of the front caps of the casings being broken away, exposing the contained sheaves and parts of the cables.
Figure 21:
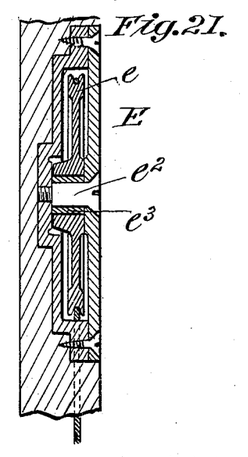
Figs. 21 and 23 are vertical cross-sections centrally of Figs. 20 and 22.
Figures 22, 23, 24, 25:
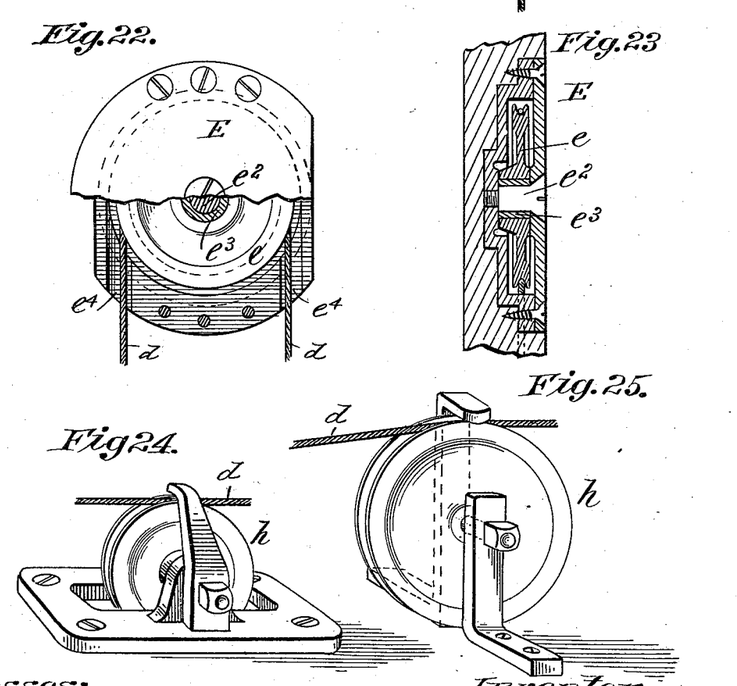
Figs. 24 and 25 are perspective views of cable-guiding sheaves and the supporting means therefor which are provided intermediate between the winding-drums and the cable-guiding devices shown in Figs. 16 and 19.

For each berth are four cables $d$, the same being secured to the corners of the berths, thence running within grooves 26 within the face of the trap-doors over and around the sheaves $e\ e$, (the sheave-casings E having the openings leading thereinto for the passage of the cables, as seen at $e^4$, Figs. 20 and 22,) and the cables thence extend downwardly along the grooved doors to and around the guiding-sheaves, which are within the sheave-cases $f$ at the corners and bottoms of the berth-pockets, to winding connections with the winding-drums F F, which rotate in horizontal planes. There are for the guidance and easy running of the cable other guide-sheaves $h\ h$ on suitable stands therefor, which are secured upon the bottom of the berth-pocket.

It will be noticed in Figs. 3, 4, and 20 to 23 that the upper pair of sheaves $e$ for the cable to support one end of the upper berth is of greater diameter than that for the pair of sheaves around which pass the cables for supporting the corresponding end of the lower berth. By this arrangement the cables may have their connections with the berths suitably near the corners of the latter and yet not interfere the one cable with the other in its course to the winding-drum.

The sheave-cases E, which are sunk within the thickness of the trap-doors D, consist of metallic boxes with front caps screwed thereon, so as to be flush with the doors, and the central screw-pin $e^2$, constituting the journal-support on which the grooved sheave $e$ is mounted, there being usually interposed an antifriction bushing-sleeve $e^3$, of graphite or other suitable material.

Figures 6, 7:
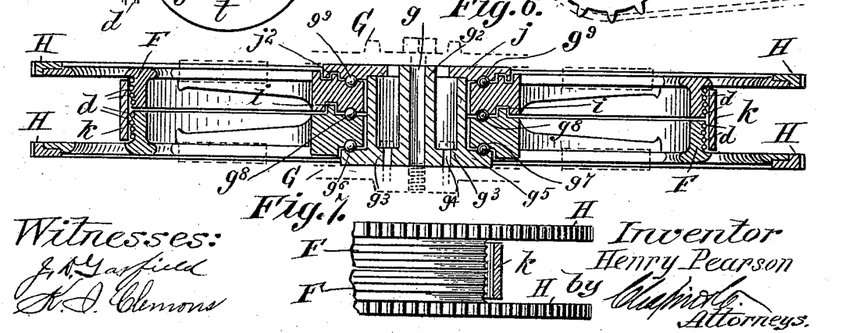
Fig. 6 is a vertical sectional view taken on the line 6 6, Fig. 5.
Fig. 7 is a side or edge view of portions of the two winding-drums and of the ring-gears therefor, and showing in section the cable-retaining ring.

The two winding-drums F F are mounted to rotate horizontally within the frame G, which consists of upper and lower halves, each, as shown, comprising the cross members 32 32 and the diagonal members 33 33, the whole being adequately stiffened by the ribs, substantially as shown. Of course this frame may be varied in design. This frame has the central journal bolt or pin $g$, about which is placed the sleeve $g^2$, which may be bolted to the lower member of the frame G by being formed with inner and outer annular walls and uniting part $g^3$ at one end, as seen at Fig. 6, through which the confining-bolts $g^4$ may be passed. This sleeve $g^2$ at its bottom has the outwardly-extended flange $g^5$ with the concentric ball-groove $g^6$ within its top face. The lower winding-drum F has its hub set loosely about the sleeve and is sustained by and slightly above the flanged part $g^5$ of the sleeve by the balls $g^7$ which are interposed, the bottom of the winding-drum hub being grooved to form in part a raceway for said balls. The upper drum is superimposed upon the lower one, the adjacent faces of the hubs being circularly grooved to constitute a race for the balls $g^8$, and there is a rib-and-groove engagement, as seen at $i$, between the proximate faces of the hubs of the two winding-drums to constitute a dust-guard. There is a circular retaining-plate $j$, which rests and is held in bearing proximity to the upper side of the top winding-drum through the medium of the interposed balls $g^9$, which are retained by the circular grooving of the said plate $j$ and top of the upper winding-drum hub. This top part of the hub and said plate $j$ have annular rib-and-groove engagements, as seen at $j^2$, for the further exclusion of dust from the bearings.

Figure 5:
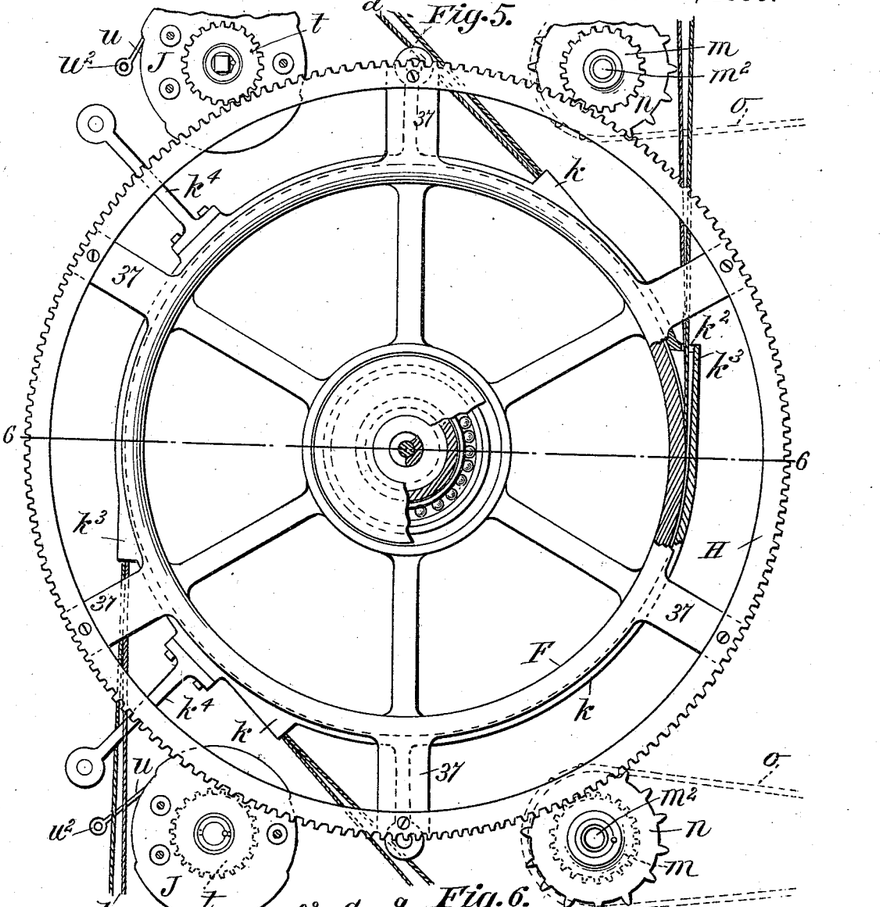
Fig. 5 is a plan view of the winding-drums, one being understood as directly over the other, and devices which pertain to and coact with said drums.

Each winding-drum has four peripheral grooves for the four cables for each berth, which cables approach the drums tangentially, as seen in Fig. 5, passing through apertures $k$ in the outwardly-distended portions $k^3$ of the retaining-ring $k$. The retaining-ring $k$ is supported concentrically and closely outside of and in common to both of the groove winding-drums by the arms $k^4$, which are primarily supported by the aforesaid frame G. The inner face of the retaining-ring is so close to the circumferentially-grooved winding-drums that the cable cannot so loosen up on the drum for any reason, whereby it might clear the grooves without having a restraining contact with the retaining-ring.

The upper drum has at or near the plane of its top and the lower drum has at or near the plane of its bottom the radially-extended arms or lugs 37 37 supporting the ring-gears H. With each of these ring-gears meshes a pinion $m$, journaled in corresponding plane to the plane of rotation of the ring-gear upon journal pins or shafts $m^2$, vertically applied between and supported by the upper and lower halves of the supporting-frame G. Each of these spur-pinions $m$ is constructed as a part of a sleeve upon which is secured a sprocket-wheel $n$, around which passes a sprocket-chain $o$, which has its course horizontally to and around the driving sprocket-wheel $p$, contained in the metallic casing and journal-support $q$, which is beneath the car-floor and secured to and supported on the vertical external wall of the berth-pocket which is toward the middle of the car-body.

Figures 8, 9, 10, 11, 12:
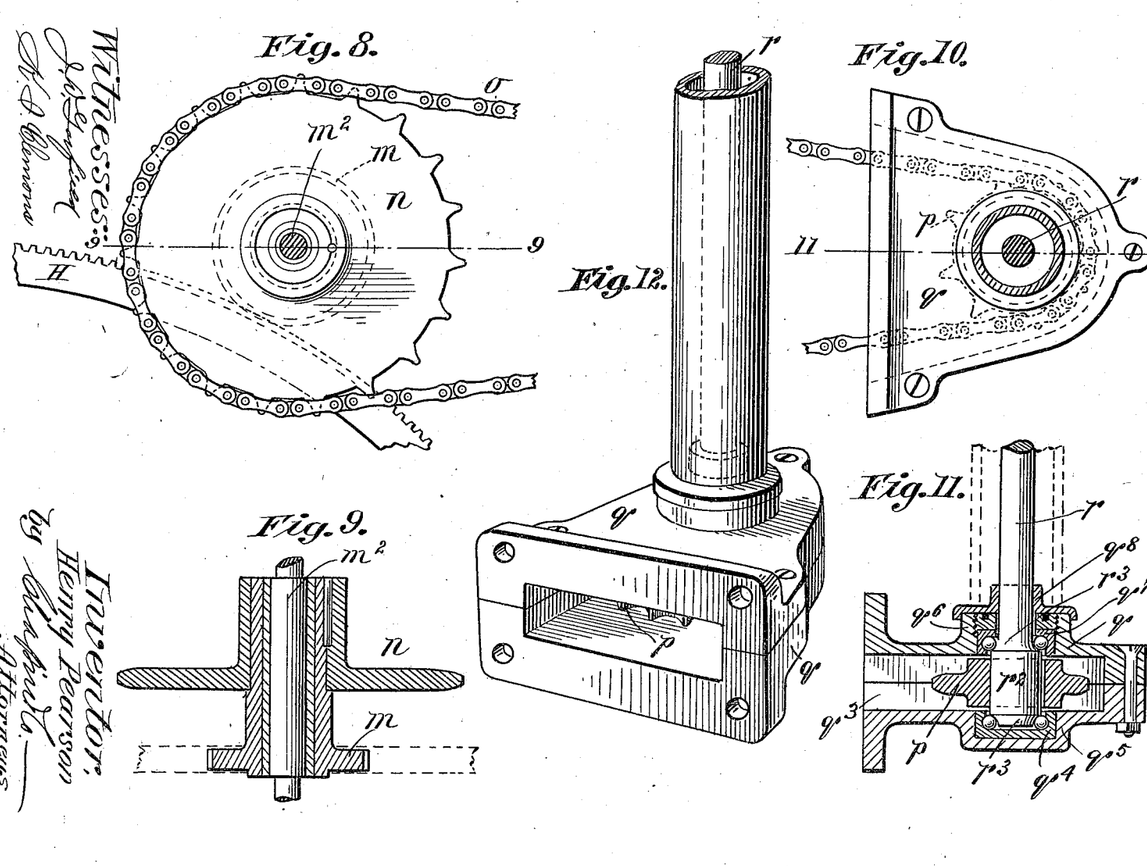
Fig. 8 is a plan view of a chain-driven sprocket-wheel with indications of the gear connection which the sprocket-wheel has with the ring-gear for one of the winding-drums.
Fig. 9 is a vertical sectional view in detail, taken on the line 9 9, Fig. 8.
Fig. 10 is a plan view showing the case for the driving sprocket-wheel for one of the winding-drums, which sprocket-wheel is indicated within the case.
Fig. 11 is a vertical sectional view on line 11 11, Fig. 10.
Fig. 12 is a perspective view showing the parts comprised in the two preceding views.
Figures 13, 14, 15:
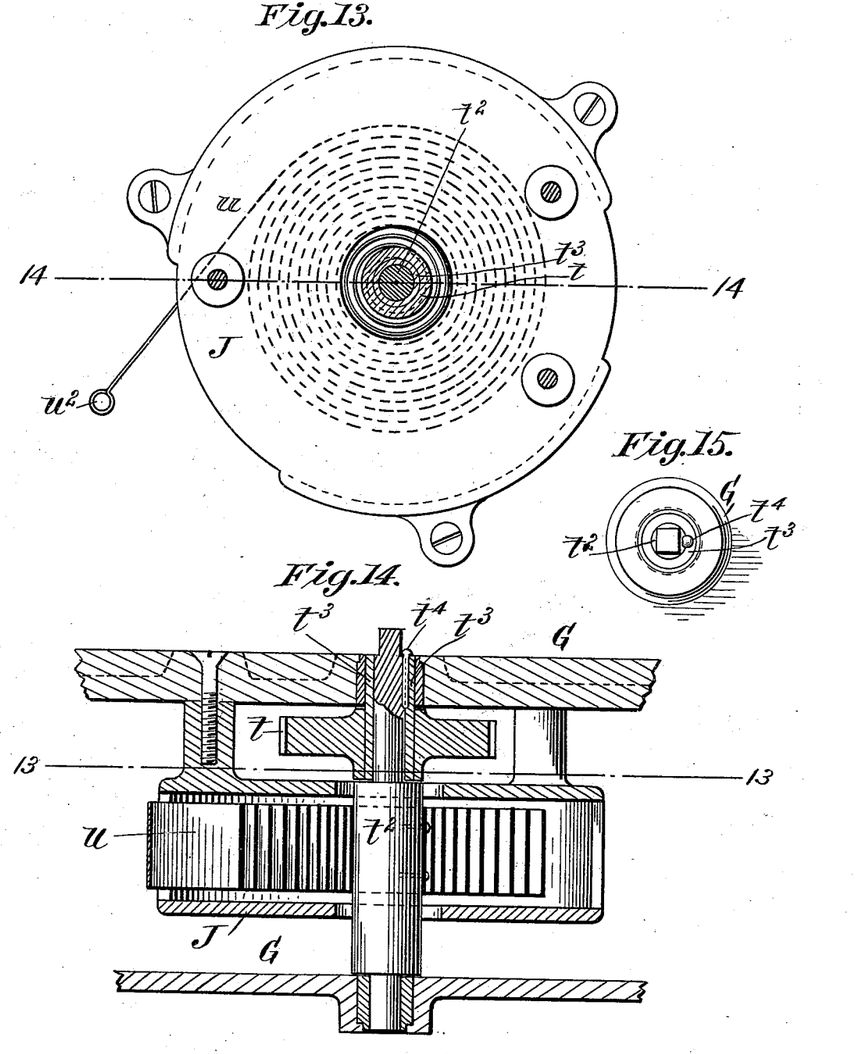
Fig. 13 is a plan view of the case for a counterbalancing-spring for one of the berths, the spring being indicated as contained within the case.
Fig. 14 is a vertical sectional view on line 14 14, Fig. 13.
Fig. 15 is a plan view in detail of the central upper portion of Fig. 14.
Figure 16:
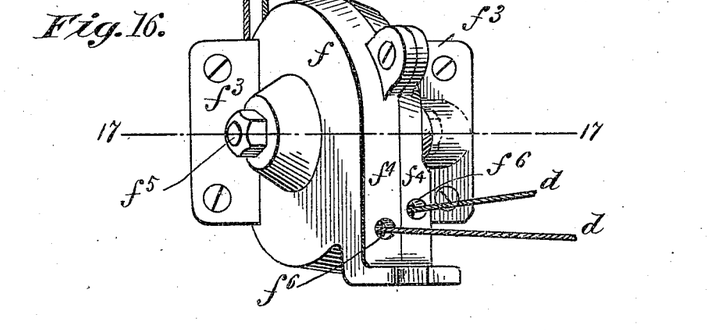
Figs. 16, 17, 18, and 19 are elevations of peculiarly-designed holder-casings for guiding-sheaves, said sheaves and their journals being clearly shown in the sectional views, Figs. 17 and 19.

The timber or sill at the side of the berth-pocket is apertured, as seen at $q^2$, to permit of the free passage of the chain to and around the driving sprocket-wheel $p$. This sprocket-wheel case $q$ consists of the upper and lower matching halves, the chamber in which opens at the side, as seen at $q^3$, Fig. 11, to the aforementioned opening $q^2$ in the sill. The sprocket-wheel $p$ is fast upon and operated by the vertical shaft $r$, which has ball journal-bearings, as seen in Fig. 11, constructed and provided in the said casing. The said sprocket-operating shaft $r$ has at its lower end, about which the sprocket-wheel $p$ is keyed or otherwise secured, the enlargement $r^2$ with the substantially conical portions $r^3$ $r^3$, against which the balls run. The lower set of balls have their bearing in the cup-like bushing $q^4$, which is set within the depression $q^5$ in the lower section of the separable casing. The upper section of this casing is formed with the hub $q^6$, which surrounds the vertical opening through the top wall and within which opening is placed the ball-bearing ring $q^7$. The upper portion of the opening through the hub $q^6$ is screw-threaded and receives therewithin the threaded ring, which may be turned down to a forcing bearing against the ring $q^7$. The cap $q^8$ overlies the upper portion of the said hub $q^6$ and closely encircles the shaft $r$.

With the ring-gear H for each winding-drum engages a spur-gear $t$, which is secured on a rotatable arbor $t^2$, to which one end of a volute counterbalancing-spring $u$ is fast, the other end of the spring being fastened to a fixed pin or part $u^2$ outside of the casing and support J, within which the said spring is inclosed. Each spring-casing J may be supported by the aforesaid frame G. Each gear $t$ is peculiarly applied to its arbor, so that when the spring is to be wound up for more or less reaction upon the arbor to change its counterbalancing effect the rotation of the arbor may be effected without rotating the gear-wheel, which is in mesh with the ring-gear H. The gear $t$ has as a part thereof a sleeve or hub $t^3$ with a keyway opposite a keyway in the end of the arbor, and the key or pin $t^4$ locks the hub and arbor together when desired. By removing the key the arbor for the spring may be turned to wind or unwind independently of the gear-wheel.

Figures 17, 18, 19:
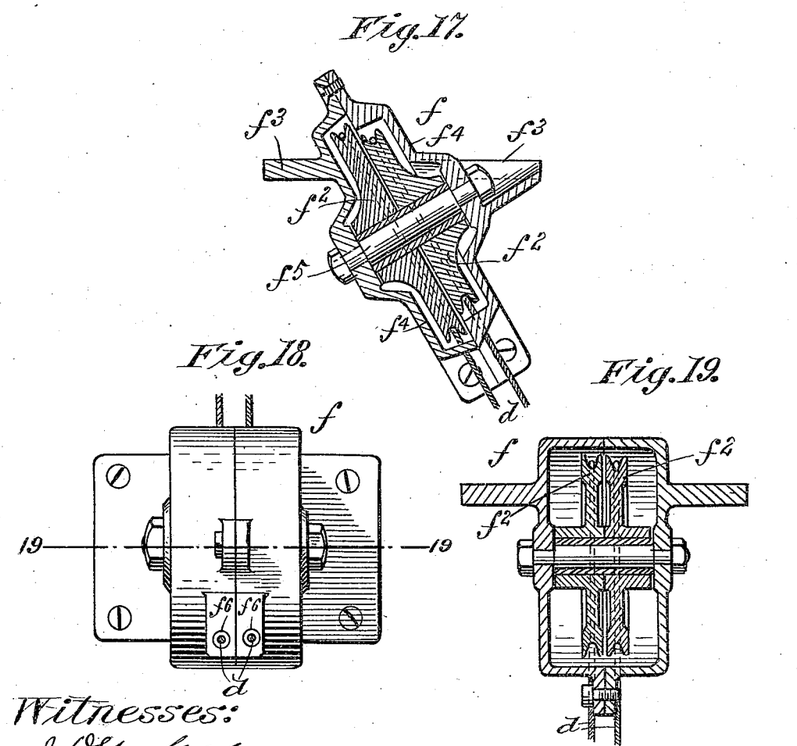

The cables for supporting one end, near the corner, of two berths run from two drums F F, tangentially and parallel with the length of the car to the corner guiding-sheaves $f^2 f^2$, these cables passing with guiding engagements over the intermediate sheaves $h$ $h$, which are arranged at different heights, as seen in Fig. 2, to correspond to the inclined courses of these two particular cables. Two other cables for the corresponding end of the two berths also run from the upper and lower winding-drums tangentially and obliquely toward the same end of the berth-pocket, but to the opposite corners thereof, and to the second set of corner guiding-sheaves, which are mounted in a journal-supporting casing especially designed to support these latter guiding-sheaves and planes oblique to the end wall of the pocket against which the sheave-casing is secured, and so that there need be necessity for but little mortising or cutting into the timber at the end of the pocket. These arrangements of the running and guiding of the cables, as above described, provided for the adjacent ends of two berths, are repeated at the opposite side of the winding-drums and at the opposite end of the berth-pocket for the supporting connections at the opposite ends of the upper and lower berths. (See Figs. 4 and 5.) The inclosing case, within which are mounted the one pair of said sheaves $f f$, on which the oblique courses of the cables run, have the attachment-lugs $f^3$, whereby they may be secured to the end partition-wall of the berth-pocket, and this case comprises separable inclosing portions $f^4 f^4$, standing obliquely to the said attachment-lugs, and these portions $f^4$ support a journal pin or bolt $f^5$, which extends across and perpendicularly to the opposite side walls of the casing. The chamber within the one half of the casing (the right-hand half, Fig. 17) is of smaller diameter than that within the other half, and the sheaves $f f$ are of unequal diameters. Thus the projection of the part of the casing which extends rearwardly beyond the plane of the attachment-lugs need not be so great as would be the case were the right-hand sheave of as great diameter as the left-hand one and the half of the casing inclosing it correspondingly enlarged. The front of each sheave-casing $f$ is provided with the apertures $f^6$ for the passage therethrough of the cables.

The two cables for each end of a given berth are arranged substantially as indicated in the drawings, they both having their ends secured to the winding-drum provided for such berth at the same circumferential point, whereby the turning of the drums in a given direction winds or unwinds both of the cables equally and insures avoidance of a slackening of the one cable while the other may be taut.

In practice each drum is never fully encircled by the connected terminal of the cable, even when the berths are fully raised.

Fig. 3 shows the manner of operating the berth elevating and lowering mechanism, the rotational force being applied to the sprocket-shaft $r$ for operating each berth by a suitable wrench or implement, as manifest.

Any adequate means may be provided for retaining the berths in their elevated positions, and such forms no part of the present invention, and hence is not here illustrated or described.

Having thus described my invention, what I claim, and desire to secure by Letters Patent, is—

1. The combination with the car provided with a berth-pocket, and trap-doors therefor, to serve as uprights, which are provided with sheaves, of the berth, winding drums mounted independently of the berth, and cables, or like flexible connections, connected to the berth, having running and supporting engagements over the sheaves, and having winding connections with the drums, substantially as described.

2. In a railway sleeping car, having the pit, or berth-pocket, the trap-doors adapted to constitute uprights and having the sheaves, the berths, the winding-drums in the berth-pocket, the cables each having a connection with the berth and with the one of the drums, and by an intermediate part having a running engagement over the sheaves supported on the trap-doors, and means for rotating the winding-drums, substantially as described.

3. The combination with the car-body having the pit, or berth-pocket, and a berth adapted to have an out-of-the-way disposition in said berth-pocket, of a winding-drum mounted independently of, removed from, the berth, and located in the berth-pocket, and cables connected to the berth and to the winding-drum and guiding supports for the cables intermediate between the berth and the winding-drum, substantially as described.

4. In a railway sleeping-car in combination, the car-body having a berth-pocket with a winding-drum therein, a berth adapted to be disposed in the berth-pocket and to be elevated therefrom, trap-doors for covering the berth-pocket and to be upwardly swung into an upright position and having sheaves mounted thereupon, cables connected to the winding-drum and also to the berth and having intermediately thereof supporting and guiding appliances the same essentially comprising the aforesaid sheave, a sprocket-wheel, $n$, having a gear connection with the drum, a chain around said sprocket-wheel and extended horizontally and transversely to the outside of the berth-pockets, a second sprocket-wheel around which the chain passes, and the vertical operating-shaft, substantially as described.

5. In a railway sleeping car, in combination, the car body having a berth-pocket with the two winding-drums, $f$, $f$, therein each having the gear-teeth, H, the berths adapted to be disposed one above the other in said berth-pocket, cables, or like flexible connections, connected to the berths and to the winding-drums and having intermediately thereof supporting and guiding appliances therefor, sprocket-wheels, $n$, $n$, fast to gear-wheels which mesh into the gear-teeth of the winding-drum, chains around said sprocket-wheels and extended horizontally therefrom to, and around, the sprocket-wheels, $p$, which are mounted at a position transversely from, and outside of the berth-pocket, and the operating-shafts, $r$, $r$, for said sprocket-wheels, $p$, substantially as described.

6. The railway car body having a berth-pocket, and the two berths adapted to be disposed therein, the winding-drums arranged to independently rotate one upon and above the other in the berth-pocket, means for rotating the drums and winding cables connected to the drums, and to the berths and having intermediately thereof supporting and guiding devices therefor, substantially as described.

7. The railway car-body having a berth-pocket and the two berths adapted to be disposed therein, one above the other having combined therewith the two drums supported in the bottom of the berth-pocket for rotation about a vertical axis, the upper one being superimposed on the lower one, and both having their proximate faces annularly grooved, receiving therein the interposed balls, and winding cables connected to the drums and to the berths and having intermediately thereof supporting and guiding devices therefor, substantially as described.

8. In a railway sleeping car, the combination with the car-body having the berth-pocket and the two berths, of the suitably supported cylindrical part, $g^2$, having at its bottom the outwardly extended flange, $g^5$, with the ball-groove, $g^6$, within its upper face, the lower winding-drum having its hub set loosely about said part, $g^2$, and having its upper and lower faces concentrically grooved, the top drum having its hub set loosely about said part, $g^2$, and having its upper and lower faces grooved, the sets of balls in the grooves therefor, between the two drums and between the lower drum and said flange, $g^5$, the plate, $j$, supported in proximity to the top of the hub of the upper drum and the set of balls between it and said latter hub, means for rotating the drums, and winding-cables connected to the drums and to the berths, having, intermediately, supporting and guiding devices therefor, substantially as described.

9. In a railway-sleeping car, the combination with the car-body having the berth-pocket and the two berths, of the suitably supported cylindrical part, $g^2$, having at its bottom the outwardly extended flange, $g^5$, with the ball-groove, $g^6$, within its upper face, the lower winding drum having its hub set loosely about said part, $g^2$, and having its upper and lower faces concentrically grooved, the top drum having its hub set loosely about said part, $g^2$, and having its upper and lower faces grooved, the sets of balls in the grooves therefor, between the two drums and between the lower drum and said flange, $g^5$, the plate, $j$, supported in proximity to the top of the hub of the upper drum and the set of balls between it and said latter hub, the hubs of the upper and lower drums having concentrical rib and groove engagements, and said plate, $j$, and the upper drum having rib and groove engagements, means for rotating the drums, and winding-cables connected to the drums and to the berths, having, intermediately, supporting and guiding devices therefor, substantially as described.

10. In a railway sleeping car, the combination with the framing, G, comprising horizontal portions which are separated and supported at different heights, the sleeve, $g^2$, axially vertical and arranged centrally of, and confined to and between, the upper and lower parts of said frame, the two winding-drums having their hubs surrounding said sleeve, the lower drum deriving its support upon an outwardly extended annular flange with which the sleeve at its bottom is provided, the plate, $j$, above the hub of the upper drum and the central bolt, $g$, together with the berths, cables, and cable-guiding supporting appliances, substantially as described.

11. In a railway sleeping car, the combination with two berths, two winding-drums, cables for each berth connected to the winding-drums therefor, and a retaining ring concentrically surrounding the circumferential portions of both of the drums about which the cables are wound which are apertured for the passage therethrough of the cables in their courses from the drum, substantially as described.

12. In a railway sleeping car, the combination of a berth, a winding-drum, mounted in the bottom of the car independently of the berth and cables, having connections with the berth and drum, and having intermediate supporting and guiding devices therefor, a wheel having a gear tooth connection with the winding-drum, and means for rotating the wheel, substantially as described.

13. In a railway sleeping car, the combination of a berth, a winding-drum having the ring-gear, H, the cables connected to the berth and to the drum, intermediate guiding and supporting appliances therefor, a wheel having a gear-tooth engagement with the winding-drum, means for rotating the wheel and a shaft, or arbor, rotatably mounted and provided with a gear meshing into the ring-gear and having the volute spring one end of which is secured thereto, the other end thereof having a restraining engagement with a part independent of said arbor, substantially as described.

14. In a railway sleeping car, in combination, the winding-drum and winding-cables running tangentially therefrom obliquely to the sides of the berth-pocket, paired guiding sheaves, and an inclosing case therefor, the latter having the attachment lugs whereby they may be secured to the wall of the berth-pocket, and having the inclosing portions, $f^4$, $f^4$, arranged obliquely to said attachment lugs, the journal-pin supported by, and perpendicularly extended from, the one to the other of said inclosing portions, the chamber within the one-half of the casing being of smaller diameter than that within the other, and the sheaves of unequal diameters, rotating about said journal-pin, substantially as described.

15. In a sleeping-car, in combination, the winding-drum provided with gear-teeth and the berth, the cables connected to the berth and to the drum and intermediately having guiding supports over sheaves which are intermediate between the berth and winding-drum, a gear in mesh with the winding-drum-gear-teeth, and an arbor therefor, a counterbalancing spring applied to said arbor so that as the berth is raised it assists in the rotation of the winding-drum and so that as the berth is lowered it, through gear connections with the winding drum, becomes wound up, substantially as described.

16. In a sleeping-car, in combination, the winding-drum provided with gear-teeth and the berth, the cables connected to the berth and to the drum and intermediately having guiding supports over sheaves which are intermediate between the berth and winding-drum, a gear in mesh with the winding-drum-gear-teeth, and an arbor therefor, a counterbalancing spring applied to said arbor so that as the berth is raised it assists in the rotation of the winding-drum and so that as the berth is lowered it, through gear connections with the winding-drum, becomes wound up, the gears, $m$, also in mesh with the winding-drum gears, and mechanism for rotating said gears, substantially as described.

17. In a sleeping-car, in combination, the winding-drum, berth, and berth-connections, and the gear-teeth provided on the winding-drum, the arbor rotatably mounted with the winding-spring having one end secured thereto and the other end restrained, a gear-wheel in mesh with the gear-teeth of the winding-drum and having a detachable connection with the spring-carrying arbor, substantially as described.

18. In a railway sleeping-car having a berth pocket, the combination with the upper and lower movable berths, the winding drums, and the trap-door having the grooves therein and having the upper and lower sets of guiding and supporting sheaves, the upper of which are of greater diameter than the lower ones, of the winding cables secured to the drums and to the ends of the berths near their corners, and intermediately thereof engaging said sheaves of unequal size, and freely running in the grooves therefor of the trap-doors, substantially as described.

19. In a railway sleeping car, the combination with the upright supports, having the upper pair of guide sheaves, and the lower pair of guide-sheaves which are smaller than, and directly vertically below, the upper ones, of the berths and winding drums, the cables connected to the winding-drums, and to the ends of the berths near their corners, the same having intermediate guide-supports, over suitable pairs of said sheaves, substantially as and for the purpose set forth.

20. The combination, in a railway sleeping car having a berth-pocket and with a winding drum provided with the geared part, H, and the gear, $m$, rotatably mounted to mesh with said geared part, H, and to move as one with the sprocket-wheel, $n$, the sprocket-wheel case, $q$, which is secured to the outer wall of the berth-pocket and has the opening which sidewise communicates with an aperture through the side wall of the berth-pocket, the sprocket-wheel, $p$, and means for turning it, and the sprocket-chain running around said two sprocket-wheels, substantially as described.

21. In a railway car having the berth-pocket with the aperture through the side thereof, and a winding-drum in the berth-pocket, of the sprocket-wheel case, $q$, secured to the side of the berth-pocket and having an opening which sidewise communicates with the said opening through the side of the berth-pocket, said case being formed in upper and lower separable halves, the lower half having a suitable depression in its bottom for a set of bearing balls, the upper half having the vertically apertured hub, $q^6$, the shaft, $r$, with the lower-end-enlargement formed with the conical portions or shoulders, $r^3$, $r^3$, and having upon such enlarged end the sprocket-wheel, $p$, the ball-bearing ring, $q^7$, set within the apertured hub and having between it and the adjacent conical shoulder, the bearing balls, and the ring screw-threading into the apertured hub against said ball-bearing ring, and mechanism for driving connection between said wheel and the winding-drum, substantially as described.

22. In a railway sleeping car, the car body having a berth pocket below the general level of the floor, a berth suspended so as to move in and out of said pocket, a winding drum in said pocket below the berth, flexible connections from said drum to the berth, and the driving wheel connected to said drum in position to be operated by a key or shaft extending through the floor of the car, all combined substantially as described.

23. In a railway sleeping car, the car body having a berth pocket below the general level of the car floor, the berth, the drum below the level of the car floor and connected to the berth substantially as described, and means extending through the car floor for winding said drum, all in combination substantially as described.

24. In a sleeping car, the car body having a berth and a berth pocket below the same, a drum in said pocket and flexible connections from said drum to the berth, and doors hinged at the ends of the berth and extensible to upright position, and connections from said door supporting the berth, all substantially as described.

25. In a sleeping car, the car body having a berth pocket, a berth which descends into or rises from said pocket, trap doors hinged at the ends of said pocket and supports which sustain the berths from said doors when said doors are in upright position, and a drum in the bottom of said pocket having flexible connections leading upward into the car and connected to the berth, all in combination substantially as described.

26. In a sleeping car, the car body having a pocket below the general level of the floor, a plurality of berths suspended above said pocket in position to lower thereinto, separate reels below the level of the floor separately connected to said berths, and separate winding mechanism extending through the floor, by which said reels may be wound, all combined substantially as described.

27. In a sleeping car, the car body having a pocket below the general level of the floor, a plurality of winding drums below the level of the floor, having flexible supports extending from said drums to supporting pulleys above the berths and thence downward to the berth which berths are arranged to rise above or fall into the pockets, counterbalancing springs connected to the winding drums, and means for turning said drums separately, all combined substantially as described.

HENRY PEARSON.

Witnesses:
WM. S. BELLOWS,
K. I. CLEMONS.